(12) United States Patent
Connah et al.

(10) Patent No.: US 12,545,883 B2
(45) Date of Patent: Feb. 10, 2026

(54) METHOD AND DEVICE FOR CULTIVATING BIOLOGICAL CELLS

(71) Applicant: AIXINNO Ltd., Cambridge (GB)

(72) Inventors: John Edward Connah, Cambridge (GB); Patrick Clemente Gilligan, Cambridge (GB); David Anthony Bullinaria, Huntingdon (GB); Kenneth Boh Khin Teo, Cambridge (GB)

(73) Assignee: AIXINNO Ltd., Cambridge (GB)

( * ) Notice: Subject to any disclaimer, the term of this patent is extended or adjusted under 35 U.S.C. 154(b) by 876 days.

(21) Appl. No.: 17/783,588

(22) PCT Filed: Dec. 11, 2020

(86) PCT No.: PCT/EP2020/085717
§ 371 (c)(1),
(2) Date: Jun. 8, 2022

(87) PCT Pub. No.: WO2021/116380
PCT Pub. Date: Jun. 17, 2021

(65) Prior Publication Data
US 2023/0028667 A1    Jan. 26, 2023

(30) Foreign Application Priority Data

Dec. 11, 2019  (DE) .................. 10 2019 134 003.9

(51) Int. Cl.
*C12M 1/36*       (2006.01)
*C12M 1/00*       (2006.01)
*C12M 1/32*       (2006.01)

(52) U.S. Cl.
CPC ............ *C12M 41/48* (2013.01); *C12M 23/12* (2013.01); *C12M 41/14* (2013.01)

(58) Field of Classification Search
None
See application file for complete search history.

(56) References Cited

U.S. PATENT DOCUMENTS

| 5,106,584 A | 4/1992 | Funakubo et al. |
| 6,146,592 A | 11/2000 | Kawashima et al. |

(Continued)

FOREIGN PATENT DOCUMENTS

| CN | 105675864 B | 11/2017 |
| DE | 10 2009 018 325 A1 | 11/2010 |

(Continued)

OTHER PUBLICATIONS

Kulik et al., Parallelization in automated stem cell culture, Procedia CIRP 65, 2017, 242-247 (Year: 2017).*

(Continued)

*Primary Examiner* — Holly Kipouros
(74) *Attorney, Agent, or Firm* — Ascenda Law Group, PC

(57) ABSTRACT

In a method for cultivating biological cells of differing types, carriers are stored in an incubator, in which the carriers comprise one or more storage chambers. One or more cultures comprising cells of a common type are stored in one of the storage chambers. Cultivation parameters are assigned to the cultures. Datasets containing organizational coordinates of each storage chamber and the cultivation parameters (Continued)

of the culture stored therein are stored in a data processing device. The carriers are removed from the incubator at predefined time intervals in order to treat the cultures according to their respective cultivation parameters. The datasets are divided into groups with correlated cultivation parameters. The cultures are subsequently treated in groups.

9 Claims, 2 Drawing Sheets

(56) References Cited

U.S. PATENT DOCUMENTS

| | | | |
|---|---|---|---|
| 7,546,210 B2 | 6/2009 | Callahan et al. | |
| 8,318,492 B2 | 11/2012 | Choo et al. | |
| 9,574,174 B2 | 2/2017 | Choo | |
| 9,946,834 B2 | 4/2018 | Johnson et al. | |
| 2012/0034596 A1 | 2/2012 | Seidl et al. | |
| 2018/0327708 A1* | 11/2018 | Cannon | C12M 41/48 |
| 2019/0106671 A1* | 4/2019 | Richardson | C12M 47/04 |
| 2019/0218591 A1* | 7/2019 | Vacic | C12Q 1/18 |
| 2019/0367863 A1* | 12/2019 | Holder | G01N 35/10 |
| 2020/0224145 A1* | 7/2020 | Shkolnikov | C12M 41/48 |

FOREIGN PATENT DOCUMENTS

| | | |
|---|---|---|
| EP | 1900806 A1 | 3/2008 |
| JP | 2012-200181 A | 10/2012 |
| JP | 5854418 B2 | 2/2016 |
| WO | 2017/143155 A2 | 8/2017 |
| WO | 2018/193612 A1 | 10/2018 |

OTHER PUBLICATIONS

Written Opinion mailed Apr. 9, 2021, from the ISA/European Patent Office, for International Patent Application No. PCT/EP2020/085717 (filed Dec. 11, 2020), English translation, 5 pgs.

International Preliminary Report on Patentability issued May 17, 2022, from The International Bureau of WIPO, for International Patent Application No. PCT/EP2020/085717 (filed Dec. 11, 2020), 12 pgs.

International Search Report mailed Apr. 9, 2021, from the ISA/European Patent Office, for International Patent Application No. PCT/EP2020/085717 (filed Dec. 11, 2020), 6 pgs.

Written Opinion mailed Apr. 9, 2021, from the ISA/European Patent Office, for International Patent Application No. PCT/EP2020/085717 (filed Dec. 11, 2020), 5 pgs.

* cited by examiner

| S | C | K | t₁ – t₂ | N | G |
|---|---|---|---|---|---|
| 1 | 1 | 1 | 11:50 – 12:50 | A | I |
| 2 | 1 | 2 | 11:30 – 12:30 | A | I |
| 3 | 1 | 3 | 13:50 – 14:50 | A | III |
| 4 | 1 | 4 | 12:45 – 13:45 | B | II |
| 5 | 1 | 5 | 12:50 – 13:40 | B | II |
| 6 | 1 | 6 | 14:45 – 15:35 | B | IV |
| 7 | 2 | 1 | 13:05 – 14:35 | A | III |
| 8 | 2 | 2 | 13:30 – 14:35 | A | III |
| 9 | 2 | 3 | 12:30 – 13:40 | B | II |
| 10 | 2 | 4 | 11:45 – 12:50 | A | I |
| 11 | 2 | 5 | 13:50 – 14:50 | A | III |
| 12 | 3 | 6 | 13:00 – 13:30 | B | II |

| G | ΔT | N |
|---|---|---|
| I | 12:00 – 12:30 | A |
| II | 13:00 – 13:30 | B |
| III | 14:00 – 14:30 | A |
| IV | 15:00 – 15:30 | B |

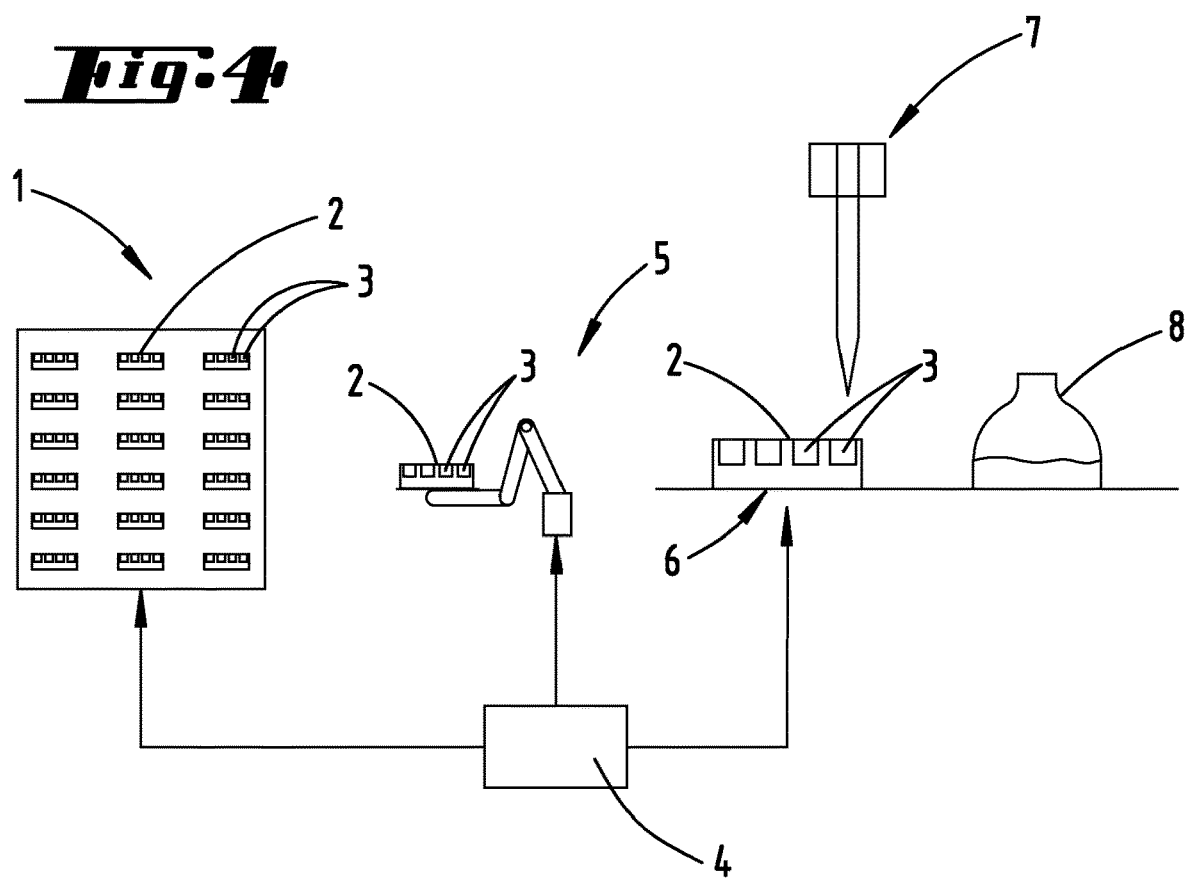

METHOD AND DEVICE FOR CULTIVATING BIOLOGICAL CELLS

RELATED APPLICATIONS

This application is a National Stage under 35 USC 371 of and claims priority to International Application No. PCT/EP2020/085717, filed 11 Dec. 2020, which claims the priority benefit of DE Application No. 10 2019 134 003.9, filed 11 Dec. 2019.

FIELD OF THE INVENTION

The invention relates to a method and a device for cultivating biological cells of different types, in which carriers are kept in an incubator and comprise one or more storage chambers, wherein one or more respective cultures comprising cells of a common type are stored in one of the respective storage chambers, wherein cultivation parameters are assigned to the cultures, wherein datasets containing organizational coordinates of each storage chamber and the cultivation parameters of the culture stored therein are stored in a data processing device, wherein the carriers are removed from the incubator at predefined time intervals so as to treat the cultures according to the respective cultivation parameters.

BACKGROUND

Methods or devices for cultivating biological cells are described in U.S. Pat. Nos. 9,574,174 B2, 9,946,834 B2, 5,106,584 A, JP 5854418 B2, CN 105675864 B, U.S. Pat. Nos. 8,318,492 B2, 7,546,210 B2 and WO 2017/143155 A2. Biological cells are stored as cultures (cell cultures) in incubators. Such an incubator has a housing, in which a plurality of carriers are arranged. Each carrier has at least one storage chamber, in which a cell culture is stored. The cell culture consists of a plurality of similar cells. Microplates or microtiter plates are usually used as the carriers, and have a uniform layout of 127.8×85.5 mm². The storage chambers of the microplates can consist of sample wells. The temperature and/or humidity inside of the incubator are kept at a predefined value. The cells can be cells of an individual, for example of a plant, an animal, or a human. However, the cells can also belong to different individuals. The cells have different cell types, such as liver cells, muscle cells, brain cells, skin cells, etc. The cells are removed from the incubator at predefined time intervals, in particular so as to biologically treat them. Nutrients can be added to the individual cultures. However, the cultures can also be divided or reduced in size if they have a number of cells that exceed a maximum number. However, cells can also be removed from the cultures at predefined time intervals so as to otherwise treat them, in particular biologically. Furthermore, the nutrient medium can be changed out, or the cultures can be assigned to other carriers. In order to keep the cell cultures alive, they must be supplied with nutrients at predefined time intervals. This takes place within predefined time windows. A pipetting system is used to remove the nutrients from a nutrient container, for example a bottle. This takes place with a pipette of the pipetting system. In the prior art, carriers are removed from the incubator one after the other, and the cultures carried by this carrier are biologically treated, wherein each type of culture is supplied with a nutrient corresponding to the type. Different pipettes are used to supply different nutrients to different supply chambers. The prior art also includes U.S. Pat. No. 6,146,592 A and EP 1900806 A1.

SUMMARY OF THE INVENTION

The object of the invention is to further develop the operation of a device for cultivating biological cells in a manner advantageous for use. In particular, it is provided that the operation of a multi-cell system be optimized.

The object is achieved by the invention indicated in the claims, wherein the dependent claims describe not only advantageous further developments of the invention indicated in the independent claims, but also constitute stand-alone solutions of the problem.

First and foremost, it is proposed that datasets be provided in a data processing device, wherein a dataset is assigned to each culture. The dataset contains organizational coordinates of the storage chamber in which the culture is located. The organizational coordinates can contain an identifier of the carrier and an identifier of the storage chamber of the carrier. The organizational coordinates can be used to identify the spatial positions of the cultures, in particular inside of the incubator. The incubator can have a plurality of regularly arranged storage spaces, which can each carry a carrier, wherein each carrier can be assigned to any storage space. In addition, the datasets contain cultivation parameters of the respective cell cultures, which can be identified via the organizational coordinates. The cultivation parameters can have information about a time window in which a nutrient must be supplied to the cell culture so as to keep it alive. The cultivation parameters can contain information about the type or kind of cells in the cell culture. The cultivation parameters can contain information about the type of nutrient and the nutrient supply. The invention provides a multiplexer, which sequentially treats the cell cultures, in particular biologically, based upon a job list, wherein the biological treatment can involve supplying nutrients, removing cells, exchanging the medium in which the cells are stored, or re-embedding the cells. The multiplexer can consist of a program of an electronic controller, which can be part of the data processing device. The method according to the invention orders the datasets by dividing the datasets into groups with correlated (e.g., exactly, regionally, or partially matching or similar) cultivation parameters. The invention also comprises those exemplary embodiments in which the datasets or the cultures represented by the datasets are divided by time windows and their nutrient type, wherein a group incorporates only those datasets or cultures that must be fed the same nutrient within a period of time. The cultures in this group are biologically treated in sequence. The cultivation parameters can indicate a first time starting at which a treatment can take place, and a second time by which a treatment must have taken place. These two times define a culture-specific time window. Each group can have a group-specific time window, and be characterized in that the cultures or datasets contained therein have a culture-specific time window, whose length exceeds the length of the group-specific time window, wherein the group-specific time window lies within each culture-specific time window. Different groups are treated one after the other in a respective treatment phase. Cultures with cells of a different cell type can be treated within a treatment phase, but be supplied with the same nutrient within the same time window. However, cells of a uniform type can also be treated. Exemplary embodiments of the invention provide that cultures of different groups be stored on a carrier. While processing the job list, this carrier is removed from the incubator at different times, wherein respective cultures of different storage chambers of the carrier are subjected in particular to a biological treatment. The carriers can be stored inside of the incubator in accordance with a chaotic or dynamic storage process. For example, a carrier removed from a first storage space with a handling machine can be deposited in a second storage space different from the first storage space after the in particular biological treatment of at least one culture carried by it. The organizational coordinates of the cultures assigned to the carrier are correspondingly changed after the carrier has been deposited in the second storage space. In particular, the method for cultivating biological cells has the following steps: Providing a plurality of cell cultures, wherein the cell cultures each have only one cell type and/or the cell types of different cell cultures differ from each other. The cell types have uniform cultivation parameters, wherein the cultivation parameters can be cell type-specific information so as to keep a culture of this cell type alive over the long term through periodic biological treatments. According to one aspect of the invention, different cell types can have coinciding or correlating cultivation parameters, so that cultures of different cell types can be in particular biologically treated in a common treatment phase. The multiplexer according to the invention is used to order the datasets by group, wherein the groups are sorted by a point in time where the biological treatment begins. After the point in time where the biological treatment begins, all cultures belonging to the group are subsequently biologically treated. In an exemplary embodiment of the invention, this is done by removing all carriers having a culture of the respective group to be treated from the incubator one after the other. This can take place in an automated fashion with the handling machine. The cultures are treated in a treatment module that can be spatially separated from the incubator. For example, a pipetting system can be used to supply liquid nutrient to the cultures from a nutrient container. In a treatment phase in which the cell cultures of one group are being treated, it is provided that the nutrient container not be changed, or only changed for a nutrient container that contains the same nutrient. In a subsequent different treatment phase, a different group of cell cultures is biologically treated. This can be done by supplying another nutrient from another nutrient container. The invention also comprises those exemplary embodiments in which a cell culture of a first group is stored in a first storage chamber of a carrier, and a cell culture of a second group different from the first is stored in a second storage chamber, wherein the carrier is removed from the incubator, returned to the incubator, for biologically treating the cell culture of the first group in a first treatment phase, and removed from the incubator and returned to the incubator for biologically treating the cell culture of the second group in a second treatment phase. The carrier can be placed in different locations in the incubator.

A device according to the invention has at least one incubator and carriers stored therein, wherein at least some of the carriers have one or more storage chambers in which biological cells are stored. The device has a data processing device that can have a controller with which the incubator and in particular a temperature or humidity in the incubator can be regulated to a target value. The controller can be used to actuate a handling machine that transports carriers stored therein. The device can have a treatment module, into which the carrier can be placed with the handling machine, and in which a biological treatment of a cell culture carried by the carrier can take place. According to the invention, each cell culture is assigned a dataset, which is stored in the data processing device, for example in a table. The dataset contains organizational coordinates, which can be used to identify the storage location of the cell culture. The organizational coordinates can contain information about the location where the carrier is stored and the position of the storage chamber in which the culture is located. The organizational coordinates serve to identify the accompanying culture with respect to its whereabouts. The dataset additionally contains cultivation parameters that contain information necessary for biological treatment. These can contain the type of nutrient and information about the nutrient supply. The information can indicate an earliest possible point in time at which the treatment must begin, and a latest possible point in time by which the treatment must have ended. Apart from qualitative features of the nutrient, the information can also contain quantitative information about the nutrient. The cultivation parameters of the datasets or cultures assigned to a common group can correlate with each other so as to match, for example. A match is provided in particular for the cultivation parameters relating to the nutrient. However, a correlation of cultivation parameters is also understood to mean when the cultivation parameters have a common intersection, for example represent a time window bounded by two timepoints. However, a correlation of cultivation parameters can also be understood to mean when the cultivation parameters contain a range specification, and there is a common range that lies within the ranges of all datasets. Two cultivation parameters can then correlate with each other if a common time window can be represented within their respective time windows. Another cultivation parameter can be the period duration that lies between two treatments. After one treatment, a range specification that indicates an absolute time range can be updated by adding the period length to the timepoint of the last treatment, and having the timepoint obtained in this way defines the position of a time window, for example the middle of the time window.

According to the invention, the table is ordered so as to be sorted by the cultivation parameters. The table contains groups of datasets, which have correlated (e.g., similar, regionally consistent, or the same) cultivation parameters. These groups are sorted among each other by times at which a biological treatment must begin.

The cultivation parameters can consist not only of information about when the biological treatment begins (i.e., when a nutrient supply begins). They can also have information about the maximum length of a time interval within which the nutrient supply must take place. Datasets can be present within a group which have different values for the time interval but the same value for when nutrient supply begins. The datasets are sorted within the group in such a way that the datasets with the shortest time intervals are treated at the beginning of a treatment phase. As a consequence, the datasets can be sorted within a group by the time intervals. In particular, the cultivation parameters each have a tuple of numerical values. The carriers preferably involve the microplates mentioned above, which comprise a plurality of sample wells arranged in a grid pattern, wherein each sample well can be a storage chamber for holding a culture.

The advantage of the method according to the invention or the device according to the invention is that carriers which differ from each other, but each carry a cell culture with correlating cultivation parameters, are removed from the incubator one after the other within a treatment phase, brought to a treatment module so as to biologically treat the cell culture there in a consistent manner, after which the carrier is returned into the incubator, wherein the nutrient stored in a treatment module is not changed within a treatment phase. As a consequence, the method according to the invention permits an economic biological treatment of the cultures in a system for multicultures.

BRIEF DESCRIPTION OF THE DRAWINGS

The invention will be described in more detail below based upon exemplary embodiments. Shown in:

FIG. 3 is a table showing a job list 10, according to which the groups G of cultures S depicted in FIG. 2 are treated in sequence, and FIG. 4 is a schematic view of a treatment device with an incubator 1, carriers 2 with storage chambers 3 arranged therein, a handling machine 5 for transporting the carriers 2 to a treatment module 6, wherein the cultures arranged in the storage chambers 3 are supplied with nutrient stored in a bottle 8 by means of a pipetting system 7.

DETAILED DESCRIPTION

Figures 1, 2:
FIG. 1 is a schematic table of twelve datasets of twelve cultures S, which are respectively stored in six storage chambers K of two carriers C, the twelve datasets including cultivation parameters having a time $t_1$ at which the treatment can begin at the earliest, and a time $t_2$ at which the treatment must have ended by the latest, and including information about the nutrient N.
FIG. 2 is a table showing a timetable 9 with four groups G: I, II, III, IV, which are treated in sequence.

FIG. 4 depicts a schematic view of a device with an incubator 1, which involves a closed container, in which a predefined temperature and/or a predefined humidity can be set. The incubator 1 has a plurality of storage spaces, which can be fitted with identically designed carriers 2, which according to the invention are shaped like microplates. Each carrier 2 has a plurality of storage chambers 3, which are preferably sample wells. In order to keep the cells of cell cultures stored in the storage chambers 3 alive over the long term, the carriers 2 are removed from the incubator 1 at predefined time intervals. This is done with the handling machine 5. The carriers 2 are transported to a treatment module 6, where a pipetting system 7 with one or more pipettes is provided. The one or more pipettes are used to remove liquid nutrient N from a bottle 8 and feed it into the storage chambers 3. Reference number 4 denotes a data processing device, which can also have a controller.

According to the invention, the cultures are treated in groups. From the total number of cultures, those which must be supplied with the same nutrient N over the short term are combined into a first group. To this end, a dataset is assigned to each culture. The cultures S are numbered 1 to 12 on FIG. 1. The exemplary embodiment provides two carriers C, which each have six storage chambers K. As a consequence, each dataset has two organizational coordinates C, K, with which a culture S can be assigned to a location.

The table shown in FIG. 1 further contains cultivation parameters $t_1$ and $t_2$, which denote the time points as of which the treatment can take place and by which the treatment must have been performed. The cultivation parameters additionally contain information about the nutrient N to be used, with two nutrients A, B being provided in the exemplary embodiment. Based upon the cultivation parameters, the cultures S can be assigned to four different groups G. For the sake of simplicity, only two cultivation parameters have been indicated. More cultivation parameters can also be provided, for example the type of cell, the duration between two treatments, etc.

FIG. 2 shows the four groups G: I, II, III and IV. The groups G each have different group-specific time windows Δt during which a treatment of cultures S can take place. In addition, each group G has a group-specific nutrient N. FIG. 2 shows a timetable 9 consisting of four sequential treatment phases.

All cultures S allocated to one of the four groups G are characterized in that the group-specific time window lies in each culture-specific time window $t_1$, $t_2$.

This yields the processing list 10 shown in FIG. 3, according to which the groups I, II, III, IV are processed one after the other, specifically at the respective beginning of a start time to.

The above statements serve to explain the inventions covered by the application as a whole, which each also independently advance the prior art at least by the following feature combinations, wherein two, several or all of these feature combinations can also be combined, specifically:

A method, characterized in that the datasets S are divided into groups G with correlating cultivation parameters $t_1$, $t_2$, N.

A method, characterized in that the cultures S are treated in groups.

A method, characterized in that the cultivation parameters C, K at least contain information about the type of nutrient N, information about a time window $t_1$, $t_2$ of treatment, information about the quantity of nutrient N, information about the duration between two treatments, information about the type of treatment and/or information about the type of cells and/or that the treatment involves nutrient supply and/or that the treatment involves removing cells from the storage chamber 3.

A method, characterized in that cultures S of different groups G are stored on a carrier 2.

A method, characterized in that the electronic data processing device 4 generates a job list 10 that contains the cultures S to be treated in chronological sequence.

A method, characterized in that the organizational coordinates C, K permit a clear identification of a carrier 2 and a storage chamber 3.

A method, characterized in that, in a treatment phase in which only respective cultures S of one group G are treated, a handling machine 5 is used according to the job list 10 to sequentially remove only those carriers 2 from the incubator 1 that store at least one culture S whose cultivation parameters have a time window $t_1$, $t_2$ in which a group-specific time window ΔT lies and which are treated in the same way, and/or that store at least one culture S which is supplied with the same nutrient N within a common time window ΔT.

A device, characterized in that the datasets are divided into groups G with correlating cultivation parameters and the data processing device 4 is programmed in such a way that, in a respective treatment phase in which only respective cultures S of one group G are treated, only those carriers 2 are sequentially removed from the incubator 1 that store at least one culture S, which is biologically treated in the same manner within a time window ΔT of this group, and/or that store at least one culture S which is supplied with the same nutrient N.

A device or a method, characterized in that the carriers 2 are microplates and the storage chambers 3 are sample wells of the microplates, and/or that the carriers 2 have a uniform, rectangular layout with a width of 127.8 mm and a depth of 85.5 mm, and/or that only a common nutrient N from a nutrient container 8 is supplied to the cultures S by means of a pipetting system 7 in a treatment phase, and/or that a pipetting system 7 controlled by a program of a controller is used, and/or that the carriers 2 are deposited in the incubator 1 in a chaotic or dynamic storage, and/or that the cultivation parameters contain information about an earliest treatment timepoint $t_1$ and a latest treatment timepoint $t_2$ for the cell type and/or the maximum number of cells in the culture S.

All disclosed features (whether taken separately or in combination with each other) are essential to the invention. The disclosure of the application hereby also incorporates the disclosure content of the accompanying/attached priority documents (copy of the prior application) in its entirety, also for the purpose of including features of these documents in claims of the present application. Even without the features of a referenced claim, the subclaims characterize standalone inventive further developments of prior art with their features, in particular so as to submit partial applications based upon these claims. The invention indicated in each claim can additionally have one or several of the features indicated in the above description, in particular those provided with reference numbers and/or indicated on the reference list. The invention also relates to design forms in which individual features specified in the above description are not realized, in particular if they are recognizably superfluous with regard to the respective intended use, or can be replaced by other technically equivalent means.

REFERENCE LIST

| | |
|---|---|
| 1 | Incubator |
| 2 | Carrier |
| 3 | Storage chamber |
| 4 | Data processing device |
| 5 | Handling machine |
| 6 | Treatment module |
| 7 | Pipetting system |
| 8 | Bottle |
| 9 | Timetable |
| 10 | Processing list |
| t0 | Start time |
| t1 | Time window, treatment timepoint |
| t2 | Time window, treatment timepoint |
| A | Nutrient |
| B | Nutrient |
| C | Carrier |
| G | Group |
| K | Storage chamber |
| N | Nutrient |
| S | Dataset |
| ΔT | Time window |

What is claimed is:

1. A method for cultivating biological cells of differing types, in which carriers (2) each comprise one or more storage chambers (3), wherein one or more cultures comprising cells of a common type are stored in each of the storage chambers (3), the method comprising:
   assigning respective cultivation parameters to each of the cultures;
   storing datasets containing organizational coordinates of each of the storage chambers (3) and the respective cultivation parameters of each of the cultures in a data processing device (4);
   removing the carriers (2) from an incubator (1) at predefined time intervals;
   treating each of the cultures in accordance with the respective cultivation parameters, wherein the cultivation parameters comprise culture-specific time windows within which treatments of each of the cultures must take place;
   dividing the datasets into groups with correlated ones of the cultivation parameters, wherein each of the groups has a group-specific time window; and
   generating a job list (10) that comprises a list of jobs, each of the jobs corresponding to one of the group-specific time windows, wherein the generation of the job list (10) comprises assigning each of the cultures to the respective jobs of the job list (10) such that for each of the jobs, the group-specific time window associated with the job falls within the respective culture-specific time windows of ones of the cultures that have been assigned to the job.

2. The method of claim 1, wherein respective ones of the cultures are treated at a same time in accordance with the job list (10).

3. The method of claim 1, wherein the cultivation parameters further comprise one or more of:
   a type of nutrient for treating each of the cultures;
   a quantity of the nutrient for treating each of the cultures;
   a duration between two treatments;
   a type of treatment for each of the cultures;
   a type of cells;
   information specifying whether one of the treatments involves supplying nutrients from a nutrient supply; and
   information specifying whether one of the treatments involves removing cells from one of the storage chambers (3).

4. The method of claim 1, wherein respective ones of the cultures belonging to different ones of the groups are stored on a common one of the carriers (2).

5. The method of claim 1, wherein each of the organizational coordinates identifies a respective one of the carriers (2) and a respective one of the storage chambers (3).

6. The method of claim 1, wherein treating each of the cultures comprises in a treatment phase during which only respective ones of the cultures of one of the groups are treated, sequentially removing by a handling machine (5) and in accordance with the job list (10) only those carriers (2) from the incubator (1) that store at least one of the cultures whose cultivation parameters have a culture-specific time window within which a first one of the group-specific time windows lies and which are to be treated in an identical manner.

7. The method of claim 1, wherein treating each of the cultures comprises in a treatment phase during which only respective ones of the cultures of one of the groups are treated, sequentially removing by a handling machine (5) and in accordance with the job list (10) only those carriers (2) from the incubator (1) that store at least one of the cultures which is to be supplied with a common nutrient within a common one of the group-specific time windows.

8. The method of claim 1, wherein during a treatment phase, ones of the cultures receive only a common nutrient from a nutrient container (8) by means of a pipetting system (7).

9. The method of claim 1, wherein the carriers (2) are placed in the incubator (1) in accordance with a chaotic or dynamic storage process.

* * * * *